US011527137B2

(12) United States Patent
Kuhn (10) Patent No.: US 11,527,137 B2
(45) Date of Patent: Dec. 13, 2022

(54) METAL DETECTION IN A HIGH FLOW TRAFFIC OBSERVATION ENVIRONMENT

(71) Applicant: Entry Shield Security LLC, Flippin, AZ (US)

(72) Inventor: Justin Kuhn, Hicksville, OH (US)

(73) Assignee: Entry Shield Security LLC, Flippin, AZ (US)

( * ) Notice: Subject to any disclaimer, the term of this patent is extended or adjusted under 35 U.S.C. 154(b) by 0 days.

(21) Appl. No.: 16/411,410

(22) Filed: May 14, 2019

(65) Prior Publication Data

US 2020/0035078 A1 Jan. 30, 2020

Related U.S. Application Data

(60) Provisional application No. 62/711,341, filed on Jul. 27, 2018.

(51) Int. Cl.
*H04N 7/18* (2006.01)
*G08B 13/196* (2006.01)
*G01V 3/10* (2006.01)

(52) U.S. Cl.
CPC ......... *G08B 13/19697* (2013.01); *G01V 3/10* (2013.01); *H04N 7/181* (2013.01)

(58) Field of Classification Search
CPC .... H04N 7/18; H04N 7/181; G08B 13/19697; G08B 13/24; G01V 3/10
USPC .......................................... 348/143; 340/551
See application file for complete search history.

(56) References Cited

U.S. PATENT DOCUMENTS

| 6,900,727 | B2 | 5/2005 | Lee |
| 7,262,690 | B2 | 8/2007 | Heaton et al. |
| 8,520,068 | B2 | 8/2013 | Naidoo et al. |
| 9,392,099 | B2 | 7/2016 | Lim et al. |
| 10,276,008 | B2 * | 4/2019 | Keene ...................... G01V 3/08 |
| 10,431,067 | B2 * | 10/2019 | Keene .................... G08B 21/18 |
| 10,504,261 | B2 * | 12/2019 | Cinnamon ........... G06K 9/3241 |
| 2005/0110634 | A1 | 5/2005 | Salcedo et al. |
| 2006/0197523 | A1 | 9/2006 | Palecki et al. |
| 2008/0151050 | A1 | 6/2008 | Self |
| 2013/0100230 | A1 | 4/2013 | Carter |
| 2016/0035196 | A1 | 2/2016 | Chan |
| 2019/0087662 | A1 | 3/2019 | Zhao et al. |
| 2019/0244346 | A1 * | 8/2019 | Schafer .................. G06T 7/155 |
| 2020/0294401 | A1 * | 9/2020 | Kerecsen ............. G05D 1/0287 |

* cited by examiner

*Primary Examiner* — Trang U Tran
(74) *Attorney, Agent, or Firm* — Taylor IP, P.C.

(57) ABSTRACT

A security system including a detection device, an imaging device and a controller. The detection device being a detection device through which people traverse. The detection device producing a signal representative of at least one of an object being carried by a person and a distribution of metal carried by the person. The imaging device produces an image of the person. The controller executing the steps of determining whether the signal from the detection device exceeds a predetermined value; instructing the imaging device to capture an image of the person if the determining step indicates that the signal exceeds the predetermined value thereby creating a captured image; transmitting the captured image to selected data devices assigned to trusted individuals; and receiving a response from at least one of the data devices, the response indicating an action to be taken regarding the person.

18 Claims, 7 Drawing Sheets

METAL DETECTION IN A HIGH FLOW TRAFFIC OBSERVATION ENVIRONMENT

CROSS REFERENCE TO RELATED APPLICATIONS

This is a non-provisional application based upon U.S. provisional patent application Ser. No. 62/711,341, entitled "METAL DETECTION HIGH FLOW TRAFFIC OBSERVATION", filed Jul. 27, 2018, which is incorporated herein by reference.

BACKGROUND OF THE INVENTION

1. Field of the Invention

The present invention relates to the detection of metal objects carried by a person, and, more particularly, to a method of determining a disposition of actions to take when a metal object is detected.

2. Description of the Related Art

Security screening technology has rapidly evolved as threats to the safety of individuals and groups of people have escalated. The Transportation Security Administration (TSA) uses millimeter wave advanced imaging technology and walk-through metal detectors to screen passengers. Millimeter wave advanced imaging technology safely screens passengers without physical contact for metallic and non-metallic threats, including weapons and explosives, which may be concealed under clothing. Generally, passengers undergoing screening have the opportunity to decline Advanced Imaging Technology (AIT) screening in favor of physical screening. However, some passengers will be required to undergo AIT screening if their airline boarding pass indicates that they have been selected for enhanced screening.

With the increase in security screening, some airports experienced long queues for security checks. To alleviate this, airports created premium lines for passengers traveling in First or Business Class, or those who were elite members of a particular airline's Frequent Flyer program.

A typical security system is manned with security personnel and alerts occur as the people traverse the system. When an alert occurs the line stops until the issue is resolved. This is of course frustrating to those in the queue.

What is needed in the art is a security system that provides for security of a facility yet does not hamper the flow of people into the facility.

SUMMARY OF THE INVENTION

The present invention provides a high traffic flow security system

The invention in one form is directed to a security system including a detection device, an imaging device and a controller. The detection device producing a signal representative of at least one of an object being carried by a person and a distribution of metal carried by the person. The imaging device produces an image of the person. The controller executing the steps of determining whether the signal from the detection device exceeds a predetermined value; instructing the imaging device to capture an image of the person if the determining step indicates that the signal exceeds the predetermined value thereby creating a captured image; transmitting the captured image to selected data devices assigned to trusted individuals; and receiving a response from at least one of the data devices, the response indicating an action to be taken regarding the person.

The invention in another form is directed to a security system method including the steps of: producing a signal representative of at least one of an object being carried by a person and a distribution of metal carried by the person traversing through a detection device; producing an image of the person as the person traverses through the detection device or after the person emerges from the detection device, the image being produced by an imaging device positioned proximate to the detection device; determining whether the signal from the detection device exceeds a predetermined value; instructing the imaging device to capture an image of the person if the determining step indicates that the signal exceeds the predetermined value thereby creating a captured image; transmitting the captured image to selected data devices assigned to trusted individuals; and receiving a response from at least one of the data devices, the response indicating an action to be taken regarding the person.

An advantage of the present invention is that the flow of people through the detection device is not bottlenecked with security personnel at the point of entry.

Another advantage is a log of events are kept.

Yet another advantage is that trusted individuals respond in a seamless manner, yet backup can be requested by any of the individuals.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
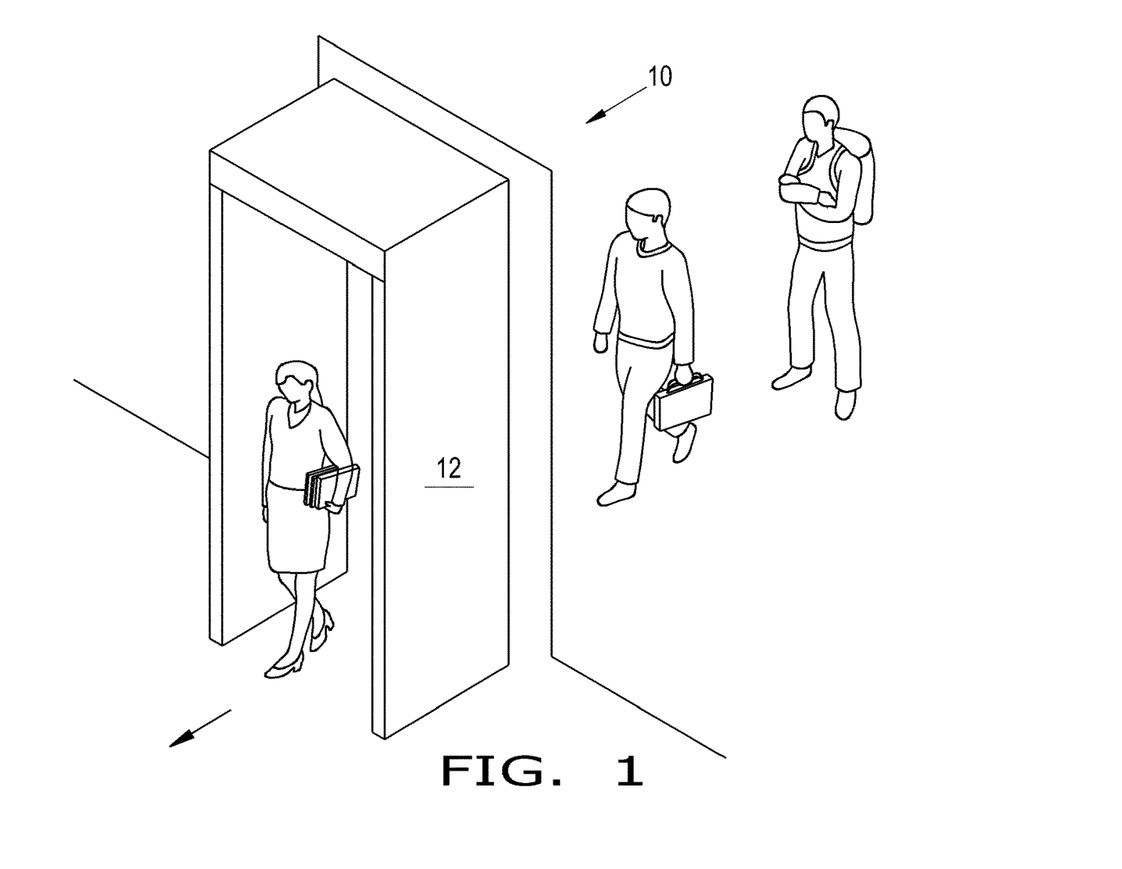
FIG. 1 is perspective view of an object detection device used in an embodiment of the security system of the present invention.

Referring now to the drawings, and more particularly to FIG. 1, there is shown a security system 10 which generally includes a detection device 12, through which people traverse, typically at an entrance to a building or a section of a building.

Figure 2:
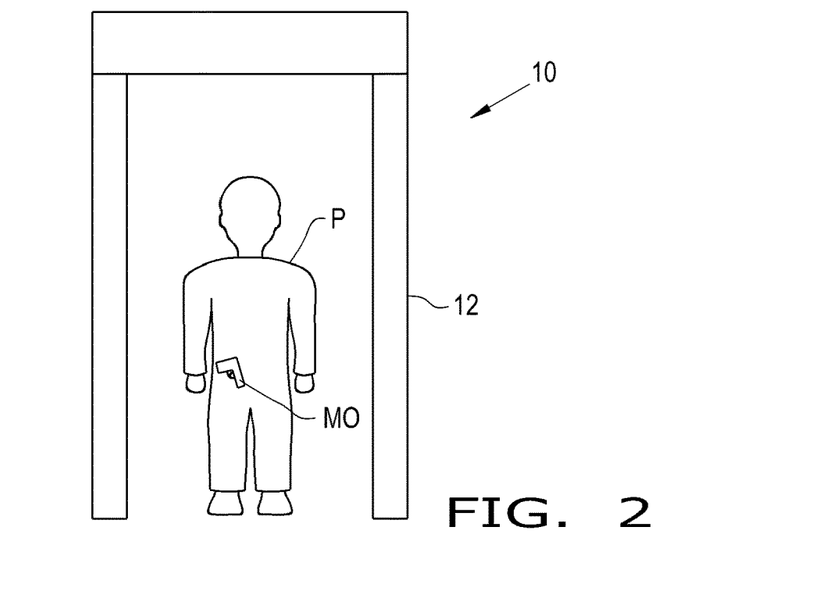
FIG. 2 is a front view of the object detection device of FIG. 1, with a person having a device on their person.

Now, additionally referring to FIG. 2, there is shown a person P with an object MO as the person goes through detection device 12. Rather than issuing a visual or audio alert at the point of entry security system 10 alerts trusted individuals without alerting the person P.

Figure 3:
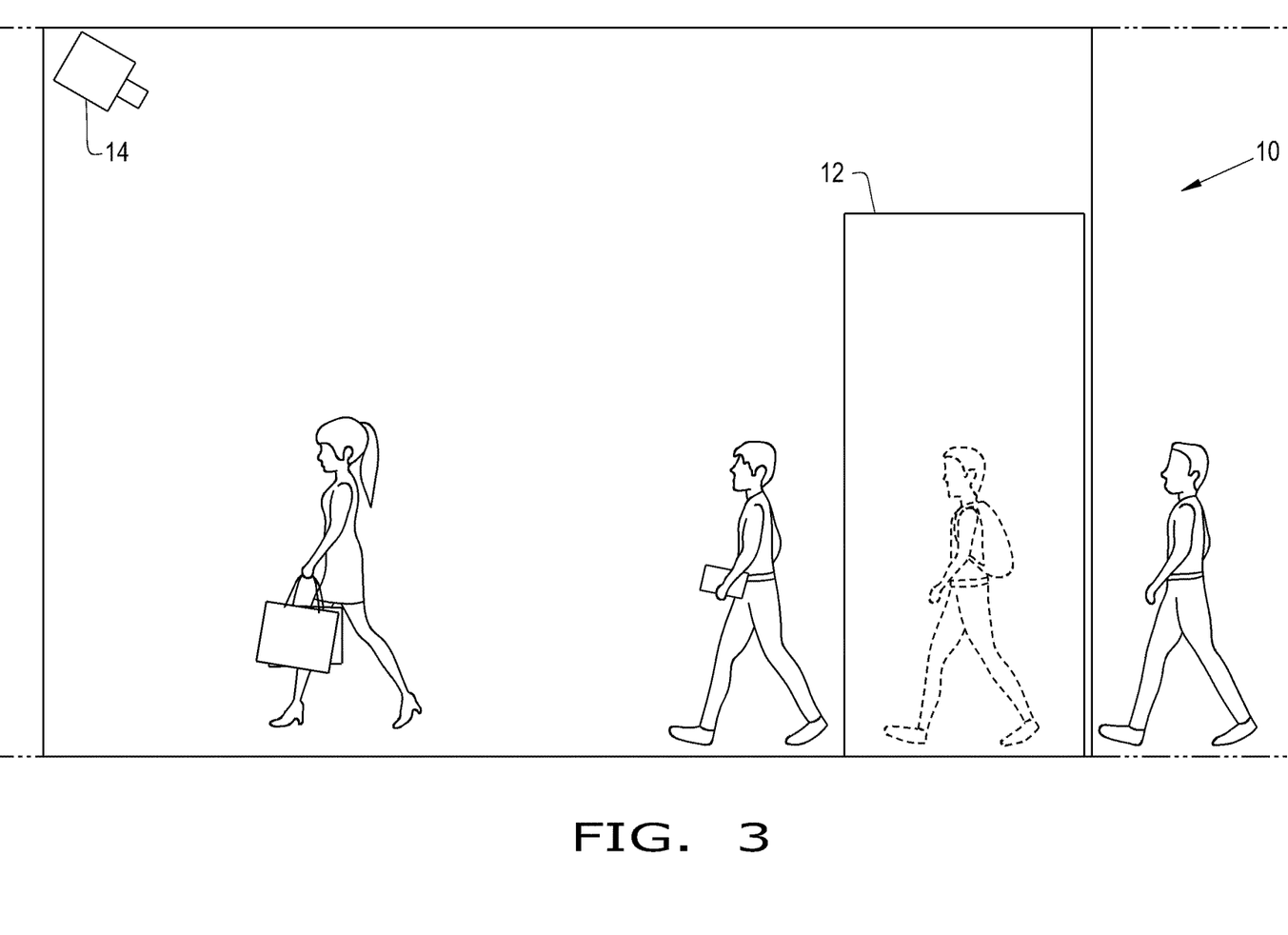
FIG. 3 is a side view of the object detection device of FIGS. 1 and 2 illustrating a continuous stream of people.

Now, additionally referring to FIG. 3 is a side view of security system 10 with an imaging device 14 illustrated that can make images of the people entering the building particularly as they enter through detection device 12. Detection device 12 may be a metal detector 12 on another type of object detector 12 that scans for particular shapes, sizes and/or geometries of objects MO that can be carried by a person P.

Figure 4:
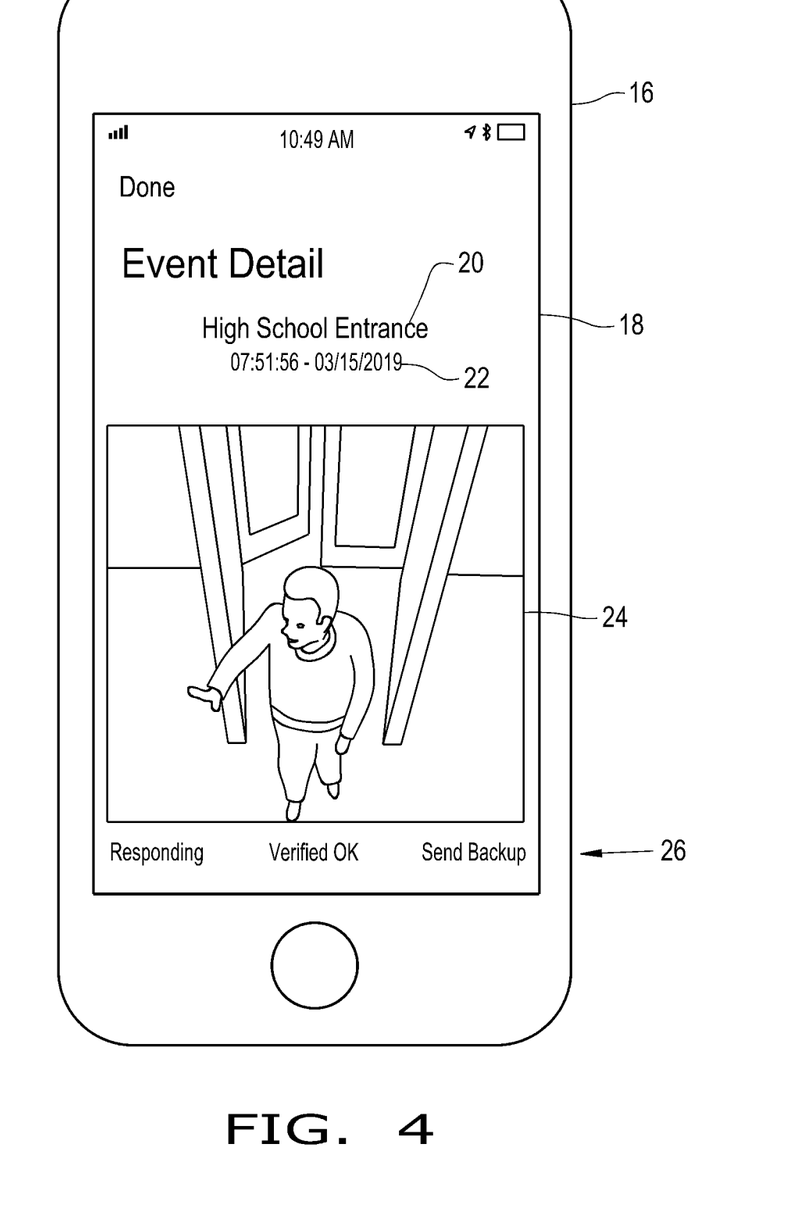
FIG. 4 is a view of a data device having an alert of the present invention sent to a trusted person.

Now, additionally referring to FIG. 4, when person P having an object MO enters through detection device 12 an alert is generated and the alert is sent to digital devices 16 of a group of trusted individuals, with information such as a location 20 of the alert, a time 22 of the alert, a captured image 24 of person P, and optional responses 26.

Figure 5:
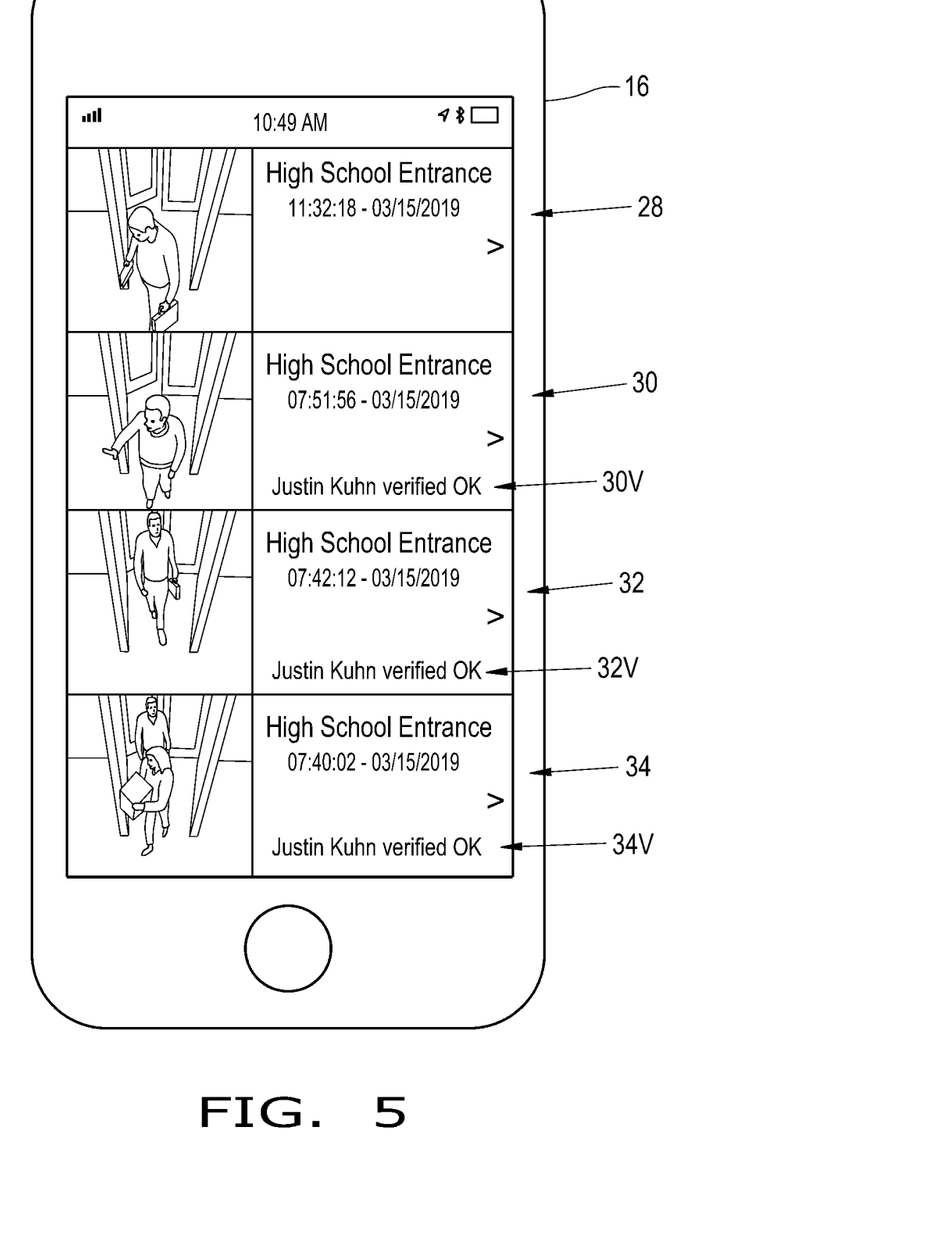
FIG. 5 is a view of a log of events of the present invention in which previous and current alerts are displayed.

Additionally referring to FIG. 5, a log of events is shown on data device 16. Events 28, 30, 32 and 34 are displayed each with the information illustrated in FIG. 4, along with the name of the verifying individual name illustrated as 30V, 32V and 34V. There is currently no disposition for event 28, which is a current alert.

Figure 6:
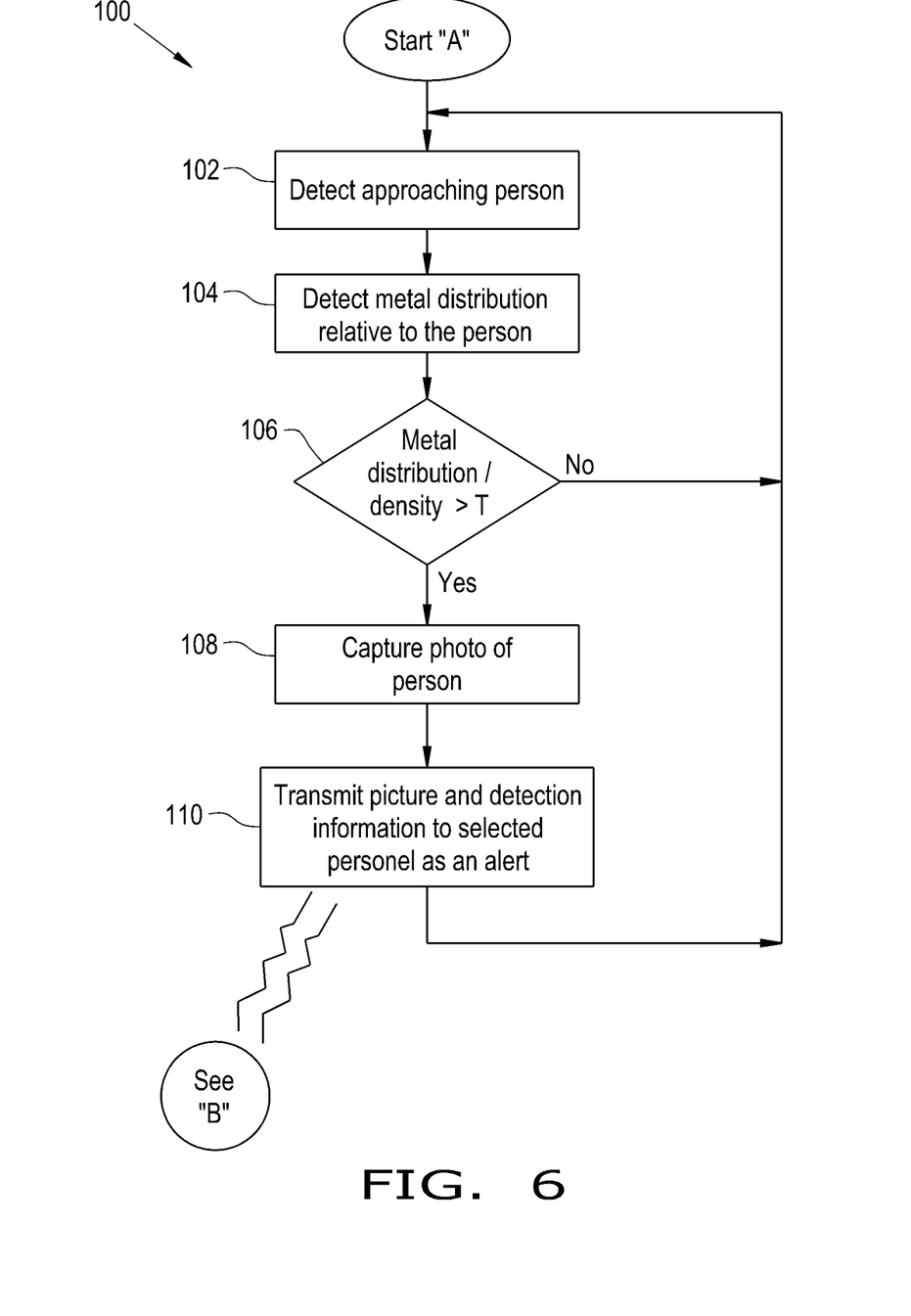
FIG. 6 is a flowchart illustrating the steps taken by the security system of the present invention.
Figure 7:
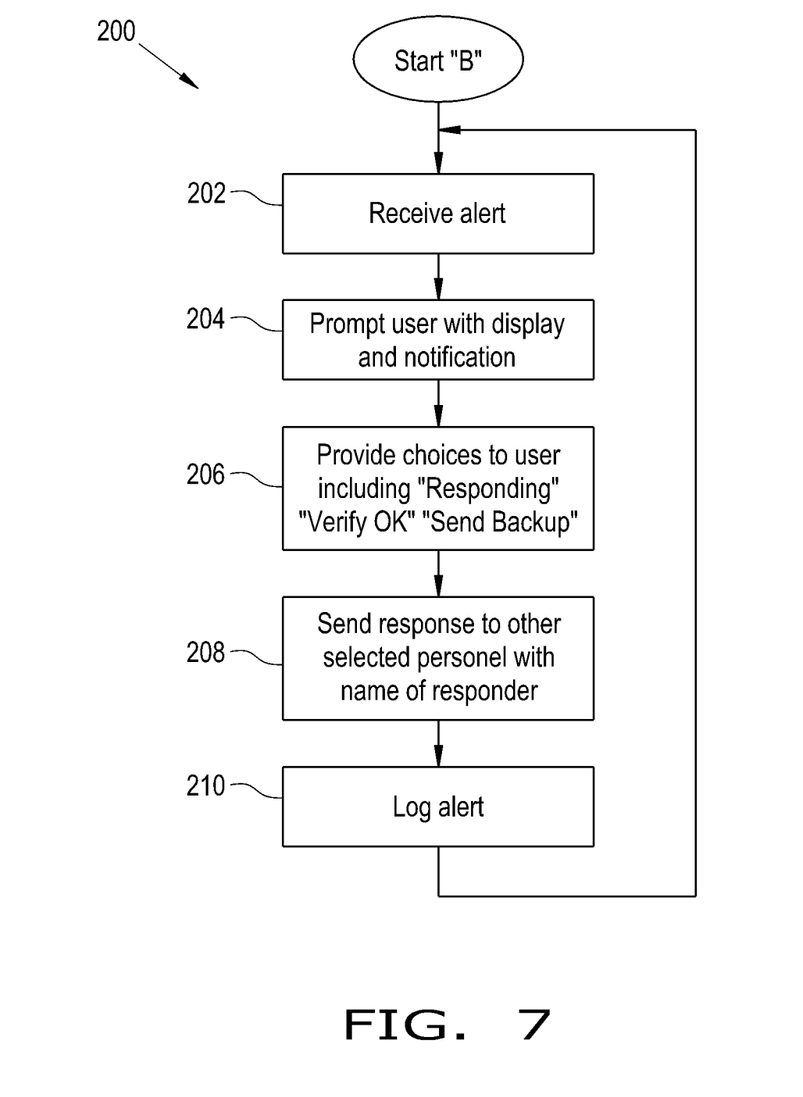
FIG. 7 is another flowchart illustrating further steps taken by the security system of the present invention.
Figure 8:
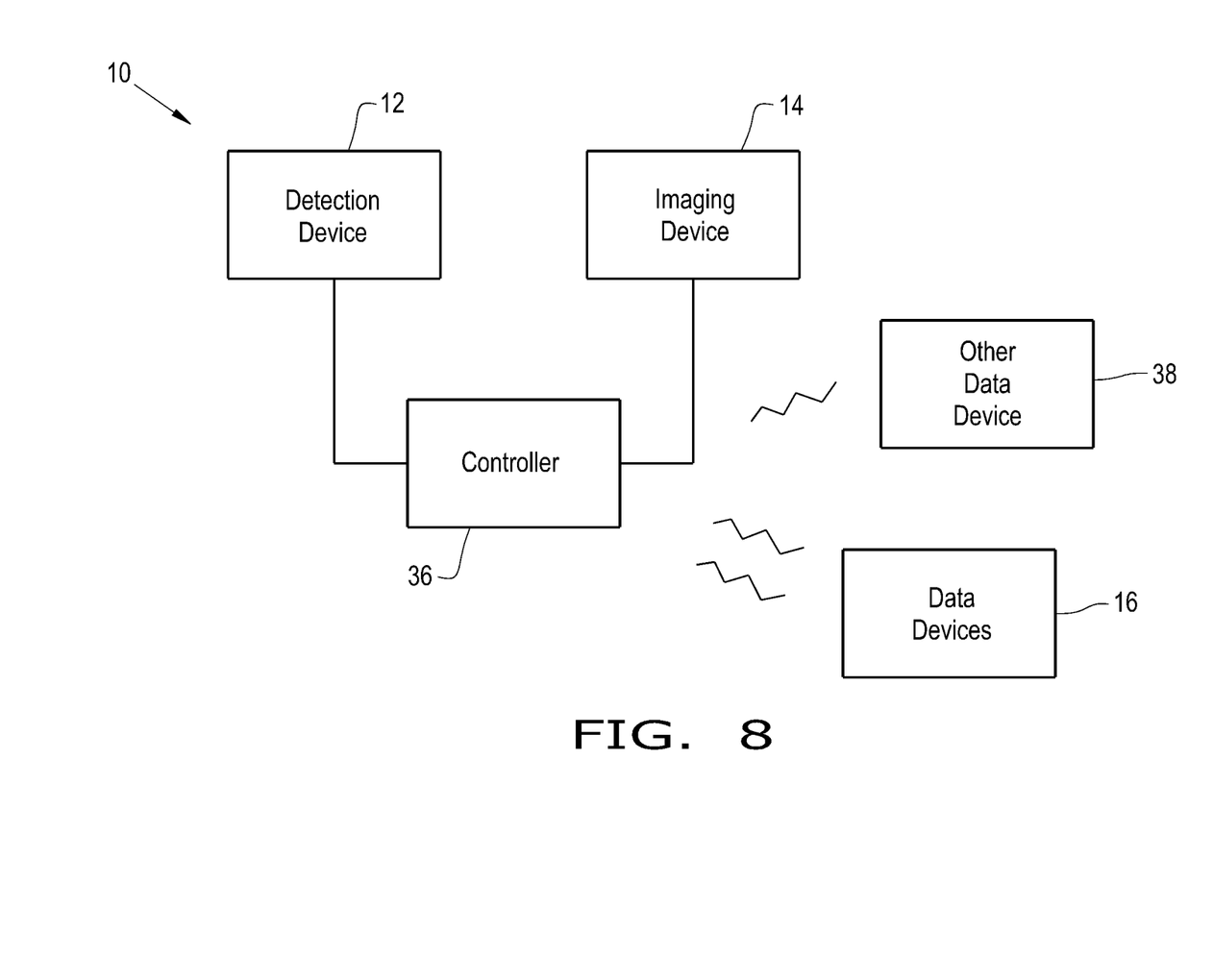
FIG. 8 is a block diagram identifying elements used in the security system of FIGS. 1-7.

Now, additionally referring to FIGS. 6-8, there are illustrated a method 100, a method 200 and a schematic illustration of security system 10.

Method 100, which can be thought of as being executed in controller 36, includes the step of detecting a person P approaching detection device 12 at step 102. At step 104 metal distribution of metallic object MO is detected, or the shape/size/geometry of object MO is detected. If the distribution of the metal/object or the concentration, shape, size, geometry or density of object MO exceeds a predetermined threshold T, then from step 106 method 100 proceeds to step 108, otherwise method 100 returns to a beginning point of the method. At step 108 an image is captured of person P and this along with identifying information as to which entrance the image is taken and the time is transmitted to the set of trusted individuals by way of their data devices 16 in the form of an alert.

Method 200 can be thought of the steps that data devices 16 execute upon receiving the alert at step 202. Image 18 is displayed on data devices 16, which then prompt the user for a response 26 (step 204). The responses provided at step 206 allow one or more of the individuals to indicate that they are "Responding", that Person P is "Verified OK", or to "Send Backup". The response is sent to the data devices 16 to update the situation, at step 208. The alert is then logged, at step 210 in a data file, the contents of the file being illustrated in FIG. 5.

Security system 10 has detection device 12 through which people traverse. Detection device 12 can be in the form of a metal detection device 12 with, metal detection device 12 producing a signal representative of at least one of an amount of metal MO being carried by a person P and a distribution of object MO carried by person P. The distribution of metal about the person may indicate small objects that should be ignored, or it may suggest a pattern (shape, size or geometry) representative of a weapon. Imaging device 14 is positioned to produce an image of person P as person P traverses through detection device 12 or after the person emerges from detection device 12.

Controller 36 is in communication with detection device 12 and imaging device 14. The controller 36 executes method 100 including the steps of: determining whether the signal from the detection device exceeds a predetermined value (Step 106); instructing the imaging device 14 to capture an image of person P if the determining step (106) indicates that the signal exceeds the predetermined value T thereby creating a captured image; transmitting the captured image (Step 110) to selected data devices 16 assigned to trusted individuals; and receiving a response (Step 208) from at least one of the data devices 16, the response indicating an action to be taken regarding the person.

Method 200 further includes a step of eliciting a security response directed at the person, by choosing "Send Backup" at Steps 206/208. The response from the data devices 16 includes "Verified OK", "Responding", and "Send Backup" as the action to be taken at step 206. These responses can also be in the form of tiers of priority, such that a tier 1, is a visual identification of the person, so they are Verified as being OK. A tier 2 alert, requires further investigation, so a Responding response is issued indicating that a responsible individual is undertaking further investigation of person P. A tier 3 alert indicates that Backup is needed to intervene with person P.

At step 208, method 200 includes sending an updated message to the data devices 16 reflecting the response and an identity of the individual issuing the response.

If the response is "Verified OK", then the data devices 16 are updated with the response, and the captured image, an identity of the responding individual, and the response is logged in a data file (Step 210). If the response is "Responding", then the data devices 16 are updated with the response and an identity of the responding individual. The responding individual evaluates person P and updates the response with "Verified OK" or "Send Backup". If the response is "Send Backup", then the data devices 16 are updated with the response, and the method further elicits a security response directed at person P, which is carried out by sending a message to at least one other data device 38, with data device 38 being under the control of security personnel or the police, in which soliciting assistance in dealing with person P is requested.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A security system, comprising:
   a detection device through which people traverse, the detection device producing a signal representative of at least one of an amount of an object being carried by a person and a distribution of metal carried by the person;
   an imaging device positioned to produce an image of the person as the person traverses through the detection device or after the person emerges from the detection device; and
   a controller in communication with the detection device and the imaging device, the controller executing a method comprising the steps of:
   evaluating the signal regarding the distribution of metal being carried by the person to establish if the distribution of metal is small and is to be ignored, and if the distribution of metal establishes a pattern suggesting a presence of a weapon;

determining whether the signal from the detection device exceeds a predetermined value;

instructing the imaging device to capture an image of the person if the evaluating step suggests the presence of a weapon or if the determining step indicates that the signal exceeds the predetermined value thereby creating a captured image;

transmitting an indication that the signal exceeds the predetermined value and the captured image to multiple selected and handheld data devices assigned to and carried by trusted individuals, the data devices having a wireless connection with the controller and being selectively locatable away from the detection device, the data devices being in the form of smart phones;

receiving a response from at least one of the data devices, the response indicating an action to be taken regarding the person; and sending an updated message to the data devices reflecting the response such that a flow of people through the detection device is not bottlenecked with security personnel; wherein the determining step of the method further includes:

the predetermined value being exceeded when the signal from the detection device indicates a concentration of the object exceeding a concentration threshold;

the predetermined value being exceeded when the signal from the detection device indicates a shape of the object exceeding a shape threshold;

the predetermined value being exceeded when the signal from the detection device indicates a size of the object exceeding a size threshold;

the predetermined value being exceeded when the signal from the detection device indicates a geometry of the object exceeding a geometry threshold; and the predetermined value being exceeded when the signal from the detection device indicates a density of the object exceeding a density threshold.

2. The security system of claim 1, wherein the response from the data devices includes one of "Verified OK", "Responding", and "Send Backup" as the action to be taken.

3. The security system of claim 2, wherein the method further includes the step of sending an identity of the individual issuing the response.

4. The security system of claim 2, wherein if the response is "Verified OK", then the data devices are updated with the response, and the captured image, an identity of the responding individual, and the response is logged in a data file.

5. The security system of claim 2, wherein if the response is "Responding", then the data devices are updated with the response and an identity of the responding individual.

6. The security system of claim 5, wherein the responding individual evaluates the person and updates the response with "Verified OK" or "Send Backup".

7. The security system of claim 2, wherein if the response is "Send Backup", then the data devices are updated with the response, and the method further includes a step of eliciting a security response directed at the person.

8. The security system of claim 7, wherein the method further includes a step of sending a message to at least one other data device soliciting assistance in dealing with the person.

9. The security system of claim 1, wherein the method further includes a step of logging the captured image, an identity of the responding individual, and the response in a data file.

10. A security system method comprising the steps of:

producing a signal representative of at least one of an object being carried by a person and a distribution of metal carried by the person traversing through a detection device;

producing an image of the person as the person traverses through the detection device or after the person emerges from the detection device, the image being produced by an imaging device positioned proximate to the detection device;

evaluating the signal regarding the distribution of metal being carried by the person to establish if the distribution of metal is small and is to be ignored, and if the distribution of metal establishes a pattern suggesting a presence of a weapon;

determining whether the signal from the detection device exceeds a predetermined value;

instructing the imaging device to capture an image of the person if the evaluating step suggests the presence of a weapon or if the determining step indicates that the signal exceeds the predetermined value thereby creating a captured image;

transmitting an indication that the signal exceeds the predetermined value and the captured image to multiple selected and handheld data devices assigned to and carried by trusted individuals, the data devices having a wireless connection with the controller and being selectively locatable away from the detection device;

receiving a response from at least one of the data devices, the response indicating an action to be taken regarding the person; and sending an updated message to the data devices reflecting the response such that a flow of people through the detection device is not bottlenecked with security personnel; wherein the determining step further includes:

the predetermined value being exceeded when the signal from the detection device indicates a concentration of the object exceeding a concentration threshold;

the predetermined value being exceeded when the signal from the detection device indicates a shape of the object exceeding a shape threshold;

the predetermined value being exceeded when the signal from the detection device indicates a size of the object exceeding a size threshold;

the predetermined value being exceeded when the signal from the detection device indicates a geometry of the object exceeding a geometry threshold; and the predetermined value being exceeded when the signal from the detection device indicates a density of the object exceeding a density threshold.

11. The security system method of claim 10, wherein the response from the data devices includes one of "Verified OK", "Responding", and "Send Backup" as the action to be taken.

12. The security system method of claim 11, further comprising the step of sending an identity of the individual issuing the response.

13. The security system method of claim 11, wherein if the response is "Verified OK", then the data devices are updated with the response, and the captured image, an identity of the responding individual, and the response is logged in a data file.

14. The security system method of claim 11, wherein if the response is "Responding", then the data devices are updated with the response and an identity of the responding individual.

15. The security system method of claim 14, wherein the responding individual evaluates the person and updates the response with "Verified OK" or "Send Backup".

16. The security system method of claim 11, wherein if the response is "Send Backup", then the data devices are updated with the response, and the method further includes a step of eliciting a security response directed at the person.

17. The security system method of claim 16, further comprising the step of sending a message to at least one other data device soliciting assistance in dealing with the person.

18. The security system method of claim 10, further comprising the step of logging the captured image, an identity of the responding individual, and the response in a data file.

* * * * *

UNITED STATES PATENT AND TRADEMARK OFFICE
CERTIFICATE OF CORRECTION

| | | |
|---|---|---|
| PATENT NO. | : 11,527,137 B2 | Page 1 of 1 |
| APPLICATION NO. | : 16/411410 | |
| DATED | : December 13, 2022 | |
| INVENTOR(S) | : Justin Kuhn | |

It is certified that error appears in the above-identified patent and that said Letters Patent is hereby corrected as shown below:

On the Title Page

At Item (71) delete "Flippin, AZ", and substitute therefore --Flippin, AR--.

Signed and Sealed this
Ninth Day of May, 2023

*Katherine Kelly Vidal*

Katherine Kelly Vidal
*Director of the United States Patent and Trademark Office*